Sept. 10, 1935. J. J. PUNKE 2,014,029
FRONT END CONSTRUCTION FOR VEHICLES
Filed March 16, 1932 2 Sheets-Sheet 1
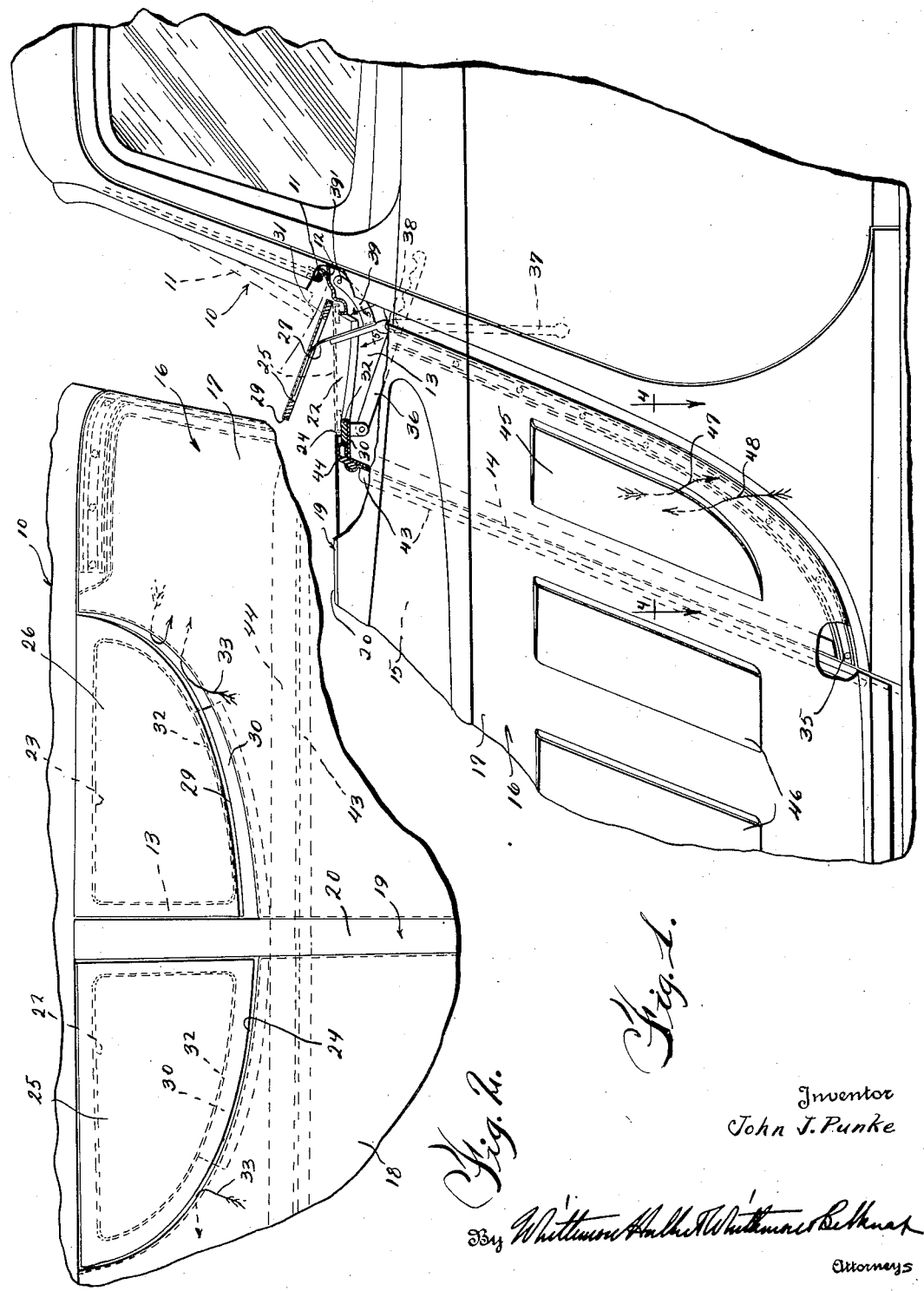

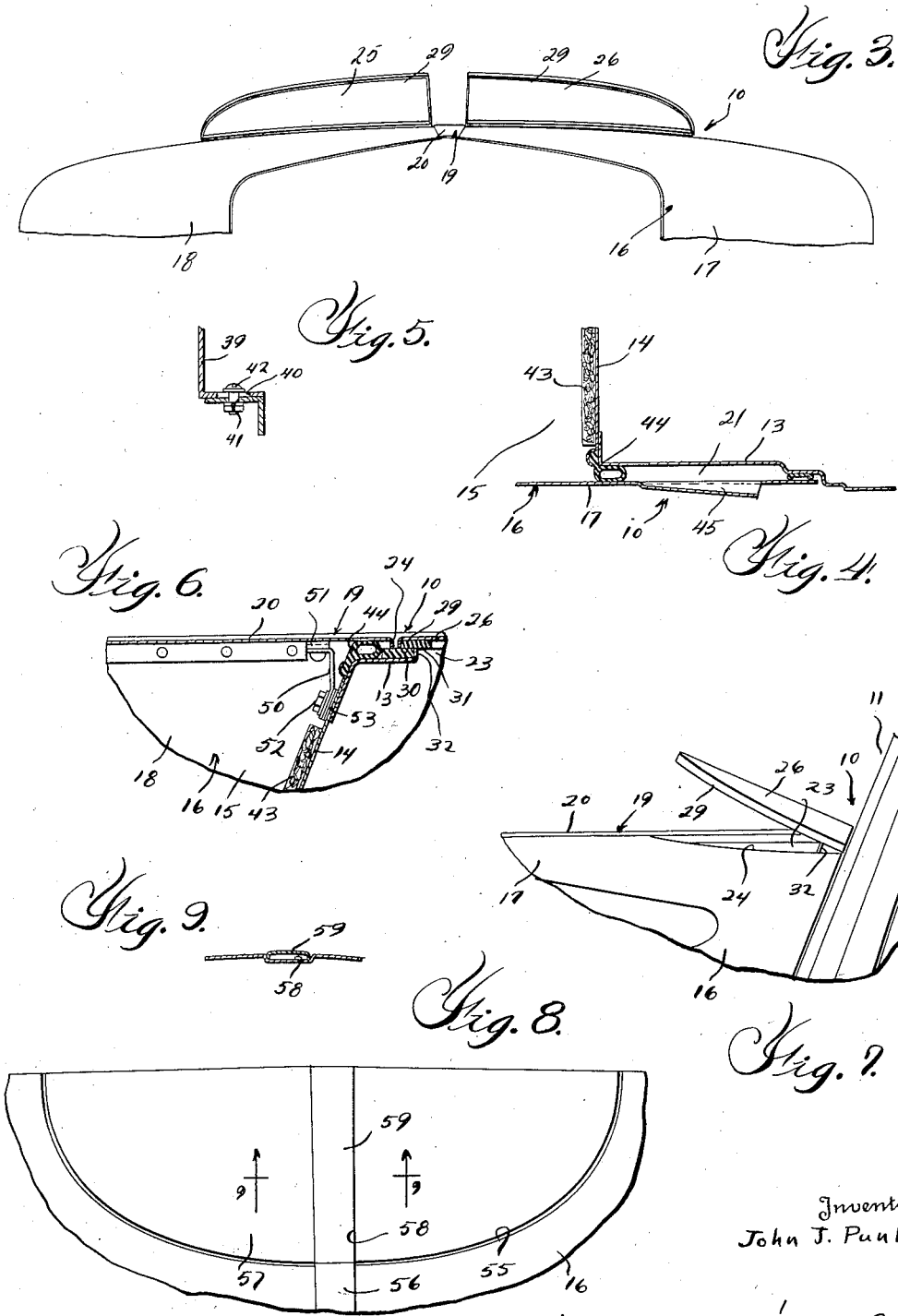

Patented Sept. 10, 1935

2,014,029

UNITED STATES PATENT OFFICE 2,014,029

FRONT END CONSTRUCTION FOR VEHICLES

John J. Punke, Detroit, Mich., assignor to Hupp Motor Car Corporation, Detroit, Mich., a corporation of Virginia Application March 16, 1932, Serial No. 599,278

19 Claims. (Cl. 98—2)

This invention relates generally to motor vehicles and refers more particularly to improved ventilating means therefor.

Although several of the features of the present invention may be incorporated in vehicles of various different designs, nevertheless, the invention finds particular utility when employed in association with motor vehicles wherein the hood for the engine compartment extends rearwardly to the conventional transversely extending belt bar adjacent the lower edge of the windshield, rendering it difficult to provide a commercially satisfactory cowl ventilating system.

It is customary in the manufacture of motor vehicles having conventional cowling between the rear edge of the hood and windshield to permanently secure a ventilator unit within an opening in the cowling and to provide means for actuating the ventilator accessible from a convenient position within the vehicle. While it is possible to mount the ventilator directly upon the hood in constructions of the type set forth in the preceding paragraph, nevertheless, it is impractical since complicated and inefficient actuating mechanism for the ventilator is necessary to compensate for the movement of the hood sections when access to the engine compartment is necessary. In an effort to eliminate the foregoing, it has been proposed to mount the ventilator on dummy cowling normally concealed by the hood and to provide a slot in the latter registering with the ventilator unit. The foregoing construction necessitates the provision of a ventilator lid considerably smaller than the registering slot through the hood in order to permit raising the sections of the latter when the ventilator lid is in its open position. This arrangement is obviously objectionable since in the closed position of the ventilator lid, a substantial space is visible between opposite side edges of the lid and adjacent side edges of the slot through the hood, thereby not only distracting from the neat appearance of the vehicle, but in addition providing pockets within which dirt and other foreign matter collects.

The present invention contemplates eliminating all of the foregoing objections by providing a relatively simple and commercially satisfactory ventilator construction mounted upon a fixed part of the vehicle independent of the hood in such a manner as to permit unobstructed operation of the hood sections irrespective of whether the ventilator lid is open or closed.

Another object of this invention resides in the provision of a ventilator structure wherein only the minimum space need be provided between the adjacent edges of the hood and ventilator lid so that when the latter is closed, the same forms a continuation of the hood.

Another object of the present invention resides in the novel means provided herein for suitably connecting the lid of the ventilator to the remaining portions of the same so as to provide for accurately positioning the lid with respect to the hood during assembly irrespective of slight inaccuracies in manufacture.

It is a further object of the present invention to provide a space between the rear edge portions of the hood and dummy cowling and to seal this space from the engine compartment so as to prevent heat generated in the latter from flowing into the aforesaid space.

A still further advantageous feature of the present invention resides in the provision of means for circulating air through the space between the hood and dummy cowling so as to cool the latter and thereby minimize the heat radiated therefrom into the interior of the vehicle.

In addition to the foregoing, the present invention contemplates the provision of means for longitudinally adjusting the hood relative to the ventilator structure and thereby provide for maintaining the space between the adjacent edges of the ventilator lid and hood at a minimum.

The foregoing as well as other objects will be made more apparent as this description proceeds, especially when considered in connection with the accompanying drawings, wherein:

Figure 1 is a fragmentary side elevational view of the front end assembly of a vehicle equipped with a ventilator constructed in accordance with this invention;

Figure 2 is a top plan view of the construction shown in Figure 1;

Figure 3 is a fragmentary perspective view of the front end construction illustrating the ventilators in their open position;

Figure 4 is a sectional view taken substantially on the line 4—4 of Figure 1;

Figure 5 is a sectional view taken substantially on the line 5—5 of Figure 1;

Figure 6 is a sectional view illustrating the means provided herein for adjusting the hood relative to the ventilator;

Figure 7 is a fragmentary side elevational view illustrating one section of the hood and the ventilator in their open positions;

Figure 8 is a fragmentary top plan view of a slightly modified form of construction;

Figure 9 is a sectional view taken on the line 9—9 of Figure 8.

Referring now to the drawings, it will be noted that there is illustrated in Figure 1 a front end construction 10 of a motor vehicle having a windshield 11 suitably hingedly connected at its upper edge to the top header of the vehicle for outward swinging movement and having the lower edge normally engaging a belt bar 12 extending transversely of the vehicle. In the present instance, the belt bar 12 is formed upon the rear edge of the dummy cowling 13 having the forward edge thereof connected to the dash 14. As is usually the case, the dash 14 forms the rear wall of the motor compartment 15 and the latter is normally closed by a hood 16 comprising essentially two sections 17 and 18 having the adjacent upper edges thereof hingedly connected at the longitudinal median line of the vehicle by means of a concealed hinge 19 of any suitable construction. Preferably, the hinge 19 comprises a cap section 20 fashioned to telescopically engage the adjacent edges of the hood sections in such a manner as to provide the desired pivotal connection therebetween. In the present instance, the rear edge of the hood extends rearwardly beyond the dash 14 to the belt bar 12 in spaced overlapping relation to the dummy cowling 13 so as to provide a chamber 21 therebetween. The foregoing arrangement is such that the dummy cowling 13 is concealed by the hood, thereby imparting a neat and trim appearance to the vehicle.

In the construction shown in Figures 1 and 2, the upper wall of the dummy cowling 13 is formed with a pair of openings therethrough designated in Figure 2 by the reference characters 22 and 23. As will be observed from the above figure, the openings 22 and 23 are arranged within the dummy cowling on opposite sides of the hinge 19 and the rear edges of the hood 16 are cut away as at 24 to provide recesses in registration with the openings aforesaid so as to permit the passage of air through the dummy cowling into the vehicle. The flow of air through the openings in the dummy cowling is controlled by a pair of ventilators 25 having lids 26 and having deflectors 27 secured to the inner surfaces of the lids for deflecting the air downwardly into the vehicle. The lid sections 26 of the ventilators correspond in shape to the recesses 24 in the rear end of the hood 16 and are fashioned to assume a position within the recesses with the outer surfaces in the plane of the hood and with the edges thereof adjacent the edges of the recesses spaced from the latter edges a minimum distance sufficient only to provide for the necessary swinging movements of the lids relative to the hood in the closed position of the latter. The rear edges of the ventilator lids, on the other hand, are normally in substantial alignment with the rear edges of the hood sections, with the result that the lids simulate in appearance portions of the hood in the closed positions thereof. The marginal edges of the ventilator lids 26, as well as the adjacent edges of the hood, are provided with downwardly extending flanges 29 normally located in relatively close proximity as indicated above and engageable with a sealing strip 30 fixed to the dummy cowling. The ventilator lids 26 are also provided with seals 31 secured to the inner surfaces thereof for sealing engagement with flanges 32 extending upwardly from the marginal edges of the openings 22 and 23. The sealing strip 30 forms a support for the adjacent edges of the ventilator and hood and preferably extends for only a portion of the length of said edges so as to permit circulation of air into the chamber 21 in the closed position of the ventilators as indicated by the arrows 33 in Figure 2. Any water finding its way through the ventilator openings 22 and 23 flows directly into the chamber 21 and is discharged therefrom at the lower end thereof through openings 35 formed in the cowling adjacent the lower ends of the chamber 21. It will also be apparent that the openings 35 communicate with the exterior and that these openings are concealed by the hood when the latter is in its closed position.

As previously stated, it is one of the principal objects of the present invention to provide for unobstructed movement of the hood sections when the ventilator lids 26 are in their open positions while at the same time maintaining the adjacent edges of the ventilator lids and hood sections in close proximity to each other. The foregoing is accomplished herein by imparting a substantially triangular shape to the ventilator lids as shown in the top plan view illustrated in Figure 2. In detail, the inner adjacent edges of the ventilator lids extend at substantially right angles to the rear edges aforesaid thereof in juxtaposition to the hinge member 19, and the forward edges of the lids define an arc from the outer ends of the said rear edges to the forward ends of the adjacent edges of the lid. By curving or otherwise relieving the outer front edge portions of the ventilator lids, the hood sections may be readily moved without interference with the lids even though the latter are opened to their fullest extent and irrespective of the slight clearances provided between adjacent edges of the recesses and lids. As previously stated, the rear edges of the ventilator lids are located adjacent the fixed belt bar 12, and, accordingly, it is not necessary to compensate for the slight rearward travel of the lids incident to moving the ventilator lids to their open positions by the following operating mechanisms.

The ventilator lids 26 are preferably independently actuated by separate operating mechanisms identical in construction in that each comprises a ratchet 36 and an operating arm 37 having the upper end thereof fixed to the deflector 27 and having a portion 38 intermediate the ends for engaging the ratchet 36. The ventilator lids are pivotally supported upon suitable arms 39 having the rear ends hingedly connected to a fixed part of the vehicle as at 39' and having the forward ends secured to the deflectors 27. The securing means between the deflectors and arms 39 is such as to provide for lateral adjustment of the ventilator lids relative to the hood 16 during assembly and thereby compensate for any slight inaccuracies in manufacture. In detail, the forward ends of the arms 39 are provided with slots 40 therein adapted to register with corresponding slots 41 in the deflectors and adjacent portions of the operating arms for receiving suitable bolts 42. The slots preferably extend in transverse directions so determined as to not only provide for lateral adjustment of the ventilator lids relative to the side edges of the recesses in the hood, but in addition to permit slight vertical adjustment thereof relative to the marginal flanges 32 on the dummy cowling so as to insure a sealing engagement therebetween.

Provision is also made herein for longitudinally adjusting the hood 16 relative to the ventilators so as to increase or decrease the space between the rear edges of the hood and the adjacent front edges of the ventilator lids. In detail, the above is accomplished herein by providing a bracket 50 secured to the front side of the dash panel and having a forwardly extending portion 51 fashioned to abut the rear ends of the male sections of the hinge 19 which are secured to the hood sections in the usual manner. As shown particularly in Figure 6, the bracket is secured to the dash by a removable bolt 52 and a plurality of shims 53 are interposed between the bracket and dash so that by increasing or decreasing the number of shims, the desired adjustment of the hood may be accomplished.

In particularizing upon the advantageous features of the present invention reference was made to the desirability of sealing the chamber 21 from the interior of the motor compartment so as to prevent the heated air in the latter from escaping into the chamber and unduly heating the dummy cowling. In the present instance, the chamber 21 is insulated from the motor compartment by insulating material 43 fixed to the dash panel and also by a sealing strip 44. The sealing strip 44 is seated upon the front end of the dummy cowling between the latter and adjacent portions of the hood 16 and is preferably substantially coextensive with the cowling as shown in the drawings. In this connection, it is to be noted that the strip 44, in addition to sealing the motor compartment from the chamber 21, also assists the strip 30 in supporting the hood.

While the foregoing arrangement tends to maintain the dummy cowling relatively cool by excluding the heated air from the chamber 21 surrounding the dummy cowling, nevertheless, provision is made herein for circulating air through the chamber 21 so as to insure obtaining the desired cooling effect. In detail, the portions of each section of the hood adjacent the sides of the dummy cowling are provided with rearwardly opening louvers 45 corresponding to the remaining louver openings 46 in the hood sections communicating with the interior of the motor compartment. By providing louvers 45 in the manner specified above, a certain amount of air flowing through the ventilator openings finds its way into the chamber 21 and circulated through the latter and louvers 45 as indicated by the arrow 47 in Figure 1. Cooling of the dummy cowling in the above manner obviously minimizes radiation of heat by the cowling into the vehicle. The foregoing is also true when the vehicle is parked since in such cases the heated air in the chamber 21 being relatively light will flow upwardly through the ventilators and in so doing withdraws cool air into the chamber through the louvers 45 as indicated by the arrow 48 in Figure 1.

The modification illustrated in Figures 8 and 9 is similar to the above described form of the invention except that the same features a single ventilator construction. In detail, the rear edge of the hood is provided with a centrally arranged recess 55 and the hinge 56 for the hood sections terminates adjacent the forward edge of the recess. The recess 55 in the hood corresponds in shape to the ventilator lid 57 and the latter forms in effect a continuation of the hood 16. If desired, the portion of the ventilator lid 57 in alignment with the hinge 56 may be depressed as at 58 for receiving a suitable molding 59 simulating in appearance the hinge 56. As in the first described form of the invention, the adjacent edges of the hood and ventilator lid are arranged in close proximity to each other and the latter is of such contour as to provide for unobstructed movement of the hood sections when in its open position.

What I claim as my invention is:

1. A front end construction for vehicles having a windshield, a hood extending rearwardly to a point adjacent the windshield and provided with a movable section having a portion of the rear edge thereof cut away to form a recess, a ventilator adjustably supported upon a fixed part of the vehicle and having a lid conforming in shape to the recess in the movable section of the hood and fashioned to assume a position in said recess with the outer surface forming a continuation of the corresponding surface of the movable hood section in the closed position of the latter.

2. A front end construction for vehicles having a hood provided with a movable section having a recess in the rear edge thereof communicating with the interior of the vehicle for ventilating the same, and means for controlling the flow of air through the recess including a ventilator having a lid normally located within the recess in the plane of the movable hood section and having the rear edge thereof forming a continuation of the rear edge aforesaid of the movable section of the hood.

3. A front end construction for vehicles having in combination, a windshield, a motor compartment in advance of the windshield, cowling extending from the windshield to the motor compartment, a hood for the latter compartment extending rearwardly to a point adjacent the windshield in spaced overlapping relation to the cowling providing a space for air therebetween, and means for sealing the space between the hood and cowling from the motor compartment.

4. A front end construction for vehicles having in combination, a windshield, a motor compartment in advance of the windshield, cowling extending from the windshield to the motor compartment, a hood for the latter compartment extending rearwardly to a point adjacent the windshield in spaced overlapping relation to the cowling providing a space for air between the latter and hood, means for sealing the space between the hood and cowling from the motor compartment, and means for circulating air through the said space.

5. A front end construction for vehicles having in combination, a windshield, a motor compartment in advance of the windshield, cowling extending from the windshield to the motor compartment, a hood for the latter compartment extending rearwardly to a point adjacent the windshield in spaced overlapping relation to the cowling providing a space for air between the latter and hood and having an opening therethrough communicating with said space, and a ventilator for controlling the flow of air through said opening.

6. A front end construction for vehicles having in combination, a windshield, a motor compartment in advance of the windshield, cowling extending from the windshield to the motor compartment, a hood for the latter compartment extending rearwardly to a point adjacent the windshield in spaced overlapping relation to the cowling providing a space for air between the latter and hood, said hood having an opening therethrough communicating with said space, a ventilator for controlling the flow of air through said opening, and louvers in said hood also communicating with said space and cooperating with the ventilator opening aforesaid to create a circulation of air through said space.

7. A front end construction for vehicles having a hood provided with a movable section having a recess in the rear edge thereof communicating with the interior of the vehicle for ventilating the same, means for controlling the flow of air through the recess including a ventilator having a lid mounted independent of the hood and normally located in the recess with the outer surface thereof flush with the outer surface of the movable hood section, and means for adjusting the lid relative to the hood section.

8. A front end construction for vehicles having a hood provided with a movable section having a recess in the rear edge thereof communicating with the interior of the vehicle for ventilating the same, means for controlling the flow of air through the recess including a ventilator having a lid normally located within the recess in the plane of the movable hood section, means for adjusting the ventilator lid laterally relative to the hood section, and means for adjusting the hood section relative to the ventilator lid.

9. In a front end construction for vehicles provided with a motor compartment, a hood for the latter having a movable section formed with a recess in the rear edge thereof, and a ventilator movable to open position through the recess in the hood and normally arranged with the outer face thereof flush with the corresponding face of the hood.

10. A front end construction for vehicles having a forwardly extending cowl portion, a motor compartment in advance of the cowl portion, a hood for the motor compartment extending in spaced overlapping relation to the cowling providing a space for air therebetween, and means for sealing the space aforesaid between the hood and cowling from the motor compartment including a resilient strip interposed between the front end portions of the cowling and the hood.

11. A front end construction for vehicles having in combination, a windshield, a motor compartment in advance of the windshield, cowling extending from the windshield to the motor compartment, a hood for the latter compartment extending rearwardly to the windshield in spaced overlapping relation to the cowling providing a space for air therebetween, and means for sealing the space between the hood and cowling from the motor compartment including a deformable strip secured to the front edge of the cowling throughout the extent of the latter and engaging the hood.

12. A front end construction for vehicles having a forwardly extending cowl portion, a compartment in advance of the cowl portion, a hood for the compartment extending in spaced overlapping relation to the cowl portion providing a space for air therebetween, means establishing a seal between the interior of the compartment and the space aforesaid, and means providing for the circulation of air through said space.

13. A front end construction for vehicles having a forwardly extending cowl portion provided with an opening therethrough, a hood extending in spaced overlapping relation to the cowl portion providing a space for air therebetween and also having an opening therethrough registering with the opening through the cowl portion, means establishing a seal between the hood and cowl portion in advance of the openings, and means controlling the passage of air through the openings aforesaid and permitting the admission of air into said space including a ventilator adjustably mounted on the cowl portion to assume a closed position in the opening in the hood with the outer surface thereof flush with the corresponding surface of the hood.

14. A front end construction for vehicles having a forwardly extending cowl portion, a compartment in advance of the cowl portion, a hood for the compartment extending in spaced overlapping relation to the cowl portion providing a space for air therebetween, means for substantially sealing the space aforesaid from communication with the interior of the compartment and a louver in the hood communicating with said space.

15. A front end construction for vehicles having a forwardly extending cowl portion, a compartment in advance of the cowl portion, a hood for the compartment extending in spaced overlapping relation to the cowl portion providing a space for air therebetween, and means for sealing the space aforesaid from the interior of the compartment including a strip interposed between the cowl portion and hood and operable to perform the additional function of a seat for the hood on the cowl portion.

16. A front end construction for vehicles having a forwardly extending cowl portion provided with an opening therethrough, a compartment in advance of the cowl portion, a hood for the compartment extending in spaced overlapping relation to the cowl portion providing a space for air therebetween and also having an opening therethrough registrable with the opening in the cowl portion, means establishing a seal between the space and interior of the compartment including a strip extending between the cowl portion and hood in advance of the openings and operable to perform the additional function of a seat for the hood on the cowl portion and a ventilator for controlling the passage of air through said openings and into the space aforesaid.

17. A front end construction for vehicles having a hood provided with a movable section having a recess in the rear edge thereof communicating with the interior of the vehicle for ventilating the same, and means for controlling the flow of air through the recess including a ventilator having an adjustable lid mounted independent of the hood section and normally located within the recess in the plane of the movable hood section with the forward marginal edge of the lid in close proximity to the adjacent edge of the recess, both of the latter edges being predeterminedly contoured to provide for unobstructed movement of the hood section irrespective of the position of the lid relative thereto.

18. A front end construction for vehicles having a hood provided with a movable section having a recess in the rear edge thereof communicating with the interior of the vehicle for ventilating the same, and means for controlling the flow of air through the recess including a ventilator having an adjustable lid mounted independent of the hood section and normally located within the recess in the plane of the movable hood section with the rear marginal edge forming a continuation of the corresponding edge of the hood.

19. A front end construction for vehicles having a hood provided with a movable section having a recess in the rear edge thereof communicating with the interior of the vehicle for ventilating the same, and means for controlling the flow of air through the recess including a ventilator having an adjustable lid mounted independent of the hood section and normally located within the recess in the plane of the movable hood section with the rear marginal edge forming a continuation of the corresponding edge of the hood, the forward marginal edge of the lid and adjacent marginal edge of the recess being curved rearwardly from the central portion of the hood to the rear edge of the lid.

JOHN J. PUNKE.